US010100864B2

(12) United States Patent
Rathmann et al.

(10) Patent No.: US 10,100,864 B2
(45) Date of Patent: Oct. 16, 2018

(54) FASTENER ELEMENT FOR A FASTENING SYSTEM, FASTENING TOOL, DISENGAGEMENT AND TESTING OF A FASTENER ELEMENT, METHOD FOR PROVIDING A FASTENING SYSTEM WITH A CLOSURE SEAL AND/OR A TORQUE INDICATOR

(71) Applicants: Robert Rathmann, Zerbst (DE); Steven Keiner, Lindau (DE)

(72) Inventors: Robert Rathmann, Zerbst (DE); Steven Keiner, Lindau (DE)

( * ) Notice: Subject to any disclaimer, the term of this patent is extended or adjusted under 35 U.S.C. 154(b) by 312 days.

(21) Appl. No.: 15/007,015

(22) Filed: Jan. 26, 2016

(65) Prior Publication Data
US 2016/0223005 A1    Aug. 4, 2016

Related U.S. Application Data

(63) Continuation of application No. PCT/EP2014/002065, filed on Jul. 29, 2014.

(30) Foreign Application Priority Data

Jul. 30, 2013   (DE) .......................... 10 2013 012 577

(51) Int. Cl.
*F16B 23/00*     (2006.01)
*F16B 41/00*     (2006.01)
(Continued)

(52) U.S. Cl.
CPC .......... *F16B 23/003* (2013.01); *B25B 15/005* (2013.01); *B25B 23/15* (2013.01); *F16B 41/005* (2013.01)

(58) Field of Classification Search
CPC ................ F16B 23/003; F16B 23/0092; F16B 23/0061; F16B 41/005; F16B 13/485;
(Continued)

(56) References Cited

U.S. PATENT DOCUMENTS 3,425,314 A * 2/1969 Ohlson ................... F16B 31/02
                                                                          411/7
3,854,372 A * 12/1974 Gutshall ............... F16B 1/0071
                                                                          411/1
(Continued)

FOREIGN PATENT DOCUMENTS

DE        29709124 U1    7/1997
DE        29903686 U1    7/2000
(Continued)

OTHER PUBLICATIONS

International Preliminary Report on Patentability.

*Primary Examiner* — David B Thomas
(74) *Attorney, Agent, or Firm* — Von Rohrscheidt Patents

(57) ABSTRACT

The instant invention relates to a fastener element of a fastening system, a tool for fastening, disengaging and testing the fastener element and a method for providing a fastening system with a closure seal and/or a torque indication. The fastener element of a fastening system, in particular a bolt or nut includes a tool engagement surface that is engageable by a tool, in particular a standard tool for at least partial form locking contact with the tool for fastening or disengaging the fastening system, wherein the tool engagement surface includes at least one weak spot. The fastener element is operable with standard tools and optionally reusable using special tools. Thus, manipulations by unauthorized persons are easily detectable and it is easily determinable whether a predetermined torque has been applied correctly.

15 Claims, 15 Drawing Sheets

(51) Int. Cl.
*B25B 15/00* (2006.01)
*B25B 23/15* (2006.01)

(58) Field of Classification Search
CPC ........ F16B 13/065; F16B 35/06; F16B 31/02;
F16B 31/021; F16B 31/027; F16B 1/0071
See application file for complete search history.

(56) References Cited

U.S. PATENT DOCUMENTS

| | | | | |
|---|---|---|---|---|
| 3,865,007 | A * | 2/1975 | Stanback | F16B 23/0007 411/2 |
| 4,073,160 | A * | 2/1978 | Perret | B25B 13/065 411/403 |
| 4,176,582 | A * | 12/1979 | Witte | F16B 31/02 411/7 |
| 4,187,892 | A | 2/1980 | Simmons | |
| 4,203,382 | A | 5/1980 | Mullen | |
| 4,408,936 | A * | 10/1983 | Williamson | F16B 19/05 411/281 |
| 4,742,735 | A * | 5/1988 | Stencel | F16B 31/02 81/121.1 |
| 5,092,726 | A * | 3/1992 | Wheeler | F16B 31/02 411/1 |
| 5,176,050 | A * | 1/1993 | Sauer | B25B 23/1415 81/180.1 |
| 5,256,014 | A * | 10/1993 | Wing | B25B 13/065 29/407.02 |
| 5,324,149 | A * | 6/1994 | Bainbridge | F16B 37/14 411/377 |
| 5,449,260 | A | 9/1995 | Whittle | |
| 6,698,315 | B1 * | 3/2004 | Wright | B25B 13/065 81/121.1 |
| 6,725,746 | B1 * | 4/2004 | Wright | B25B 13/065 81/121.1 |
| 7,174,811 | B2 * | 2/2007 | Wright | B25B 13/065 411/403 |
| 7,225,710 | B2 * | 6/2007 | Pacheco, Jr. | B25B 13/065 411/403 |
| 7,226,262 | B2 * | 6/2007 | Schultz | B25B 13/065 411/403 |
| 7,331,744 | B2 * | 2/2008 | Schultz | B25B 13/065 411/403 |
| 7,445,414 | B1 * | 11/2008 | Notaro | F16B 23/0007 411/432 |
| 7,484,440 | B2 * | 2/2009 | Wright | B25B 13/065 411/403 |
| 8,291,795 | B2 * | 10/2012 | Hughes | B25B 15/005 81/460 |
| 8,388,294 | B2 * | 3/2013 | Lanneree | F16B 41/005 411/403 |
| 9,593,707 | B2 * | 3/2017 | Weis | B60B 3/16 |
| 9,624,962 | B2 * | 4/2017 | Unseld | B21H 3/08 |
| 2004/0228703 | A1 * | 11/2004 | Such | B25B 13/485 411/403 |
| 2008/0166203 | A1 * | 7/2008 | Reynolds | B29C 45/14778 411/377 |
| 2008/0205974 | A1 | 8/2008 | DiStasio et al. | |
| 2013/0047797 | A1 | 2/2013 | Lukes et al. | |
| 2013/0129441 | A1 * | 5/2013 | Goss | B25B 13/065 411/8 |
| 2013/0195581 | A1 * | 8/2013 | Unseld | B21H 3/08 411/427 |
| 2015/0184687 | A1 * | 7/2015 | Weis | B60B 3/16 411/373 |

FOREIGN PATENT DOCUMENTS

| | | |
|---|---|---|
| DE | 10320655 A1 | 2/2004 |
| DE | 69833832 T2 | 8/2006 |
| DE | 202006011179 U1 | 9/2006 |
| DE | 102010029692 A1 | 12/2011 |
| DE | 102011012994 A1 | 9/2012 |
| EP | 1477689 A2 | 11/2004 |
| FR | 1309208 A | 11/1962 |
| FR | 2204243 A5 | 5/1974 |
| WO | WO0058056 A1 | 10/2000 |

\* cited by examiner

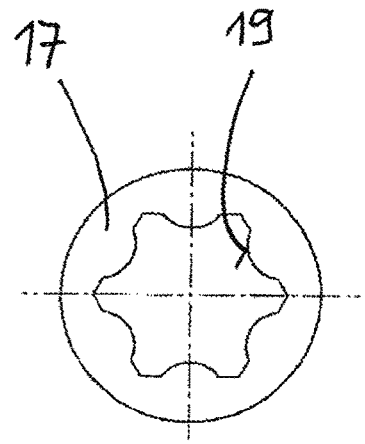
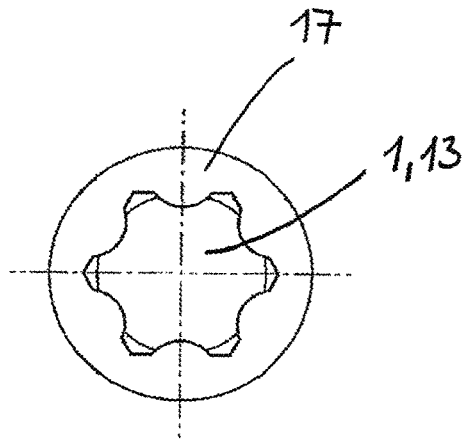
FIG. 2A  FIG. 2B
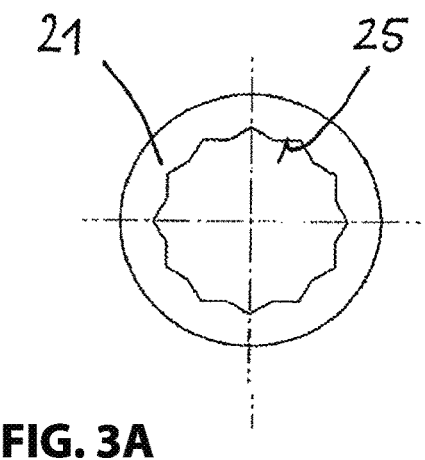
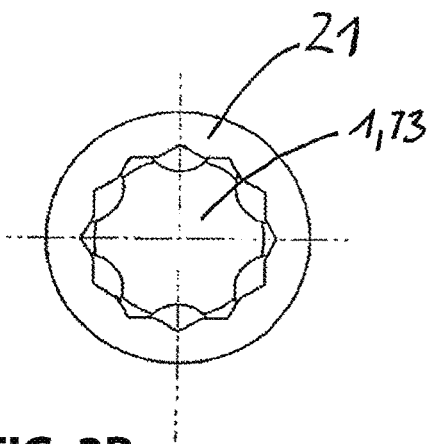
FIG. 3A  FIG. 3B
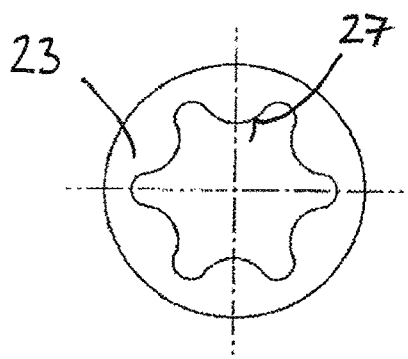
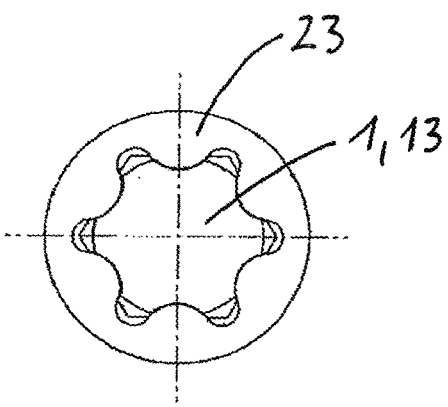
FIG. 4A  FIG. 4B

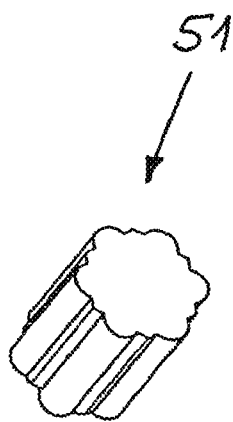 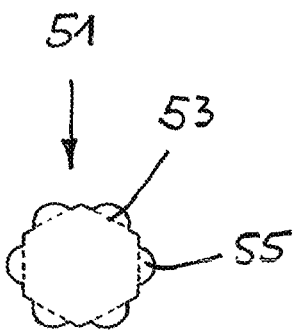
FIG. 6A  FIG. 6B

FASTENER ELEMENT FOR A FASTENING SYSTEM, FASTENING TOOL, DISENGAGEMENT AND TESTING OF A FASTENER ELEMENT, METHOD FOR PROVIDING A FASTENING SYSTEM WITH A CLOSURE SEAL AND/OR A TORQUE INDICATOR

RELATED APPLICATIONS

This application is a continuation of International Patent Application PCT/EP2014/002065 filed on Jul. 29, 2014, claiming priority from German patent application 10 2013 012 577.4 filed on Jul. 30, 2013, both of which are incorporated in their entirety by this reference.

FIELD OF THE INVENTION

The instant invention relates to a fastener element of a fastening system, a tool for connecting, disengaging and testing the fastener element and a method for providing the fastening system with a closure seal and/or a torque display.

BACKGROUND OF THE INVENTION

Numerous disengageable fastening systems are known, for example, threaded fastening systems including bolts and optionally associated nuts. For fixating and disengaging the fastening typically tools are provided that are adapted to the particular fastening system. These tools include a tool operating surface which is configured corresponding to a tool engagement surface at least at one of the fastener elements of the fastening system. On bolts the tool engagement surface forms the drive.

With respect to fastening systems of the type recited supra there is a strong need to configure them so that unauthorized disengagement is directly evident or prevented entirely.

For the latter variant new geometries of bolt drives were developed in the past in order to prevent that unauthorized persons are able to disengage and fixate these fastening systems at all with tools at hand. Among these are the tri-wing-drive, the Torq Set drive, the Pentalob drive and the Torx® Tamper drive. These configurations have the disadvantage that standard tools for everybody are available for these drives after a certain time period so that manipulations by unauthorized persons are thus possible without detection.

Another variant is described in DE 696 33 832 T2 and US 2008/0205974 A1. They describe a fastening system with bolts and nuts in which the bolts have notches and the nuts have spring elastic prongs which slide over the notches in a fixation direction, but interlock in the notches in a disengagement direction unless appropriate tools are provided so that a disengagement without appropriate tools is impossible. This variant unfortunately has a very complicated configuration which renders operations very difficult also for authorized persons. Additionally accordingly configured standard tools are typically available also for unauthorized persons after a certain time period.

In this group there are also tear off bolts which facilitate fixation but which can only be disengaged with special tools after the drive is torn off. There are one way bolts with a one way drive which can be fixated with a standard tool but can only be disengaged with a special tool. These variants in turn are cumbersome and the special tools can also be obtained by unauthorized persons.

For the variant cited first bolts, nuts and similar are used which indicate a manipulation directly. Thus, for example a seal with lacquer or a sticker can be applied which has to be destroyed during disengagement. Thus, also circumferential sealing elements can be used which also have to be destroyed first in order to provide disengagement as it is known for screw tops for beverage bottles. These configurations in turn are complicated to use and on the other hand side the seal elements can only be used once.

BRIEF SUMMARY OF THE INVENTION

Thus, it is an object of the instant invention to provide a fastening system which at least partially overcomes these disadvantages. In particular the fastening system shall also be operable with standard tools and usable multiple times with special tools. Thus, manipulations by unauthorized persons shall be advantageously easily detectable.

The object is achieved by a fastener element of a fastening system, in particular a bolt or a nut, the fastener element including a tool engagement surface that is engageable by a tool, in particular a standard tool, for at least partial form locking contact with the tool for fastening or disengaging the fastening system, wherein the tool engagement surface includes at least one weak spot which facilitates a deformation of the weak spot and/or at least a deformation or weakening of a portion adjacent to the weak spot when a particular torque is imparted upon the tool engagement surface which indicates an unauthorized use and/or an authorized use with a sufficiently large torque.

The object is also achieved by a tool for fastening, disengaging and testing the fastener element recited supra, wherein the tool includes a tool operating surface corresponding to the tool engagement surface, and wherein the tool operating surface includes at least one surface section engaging the material recess.

The object is also achieved by a method for providing a fastening system with a fastening seal and/or a torque indication wherein a fastener element of the fastening system, in particular a bolt or nut, is provided with a tool engagement surface that is engageable by a tool, in particular a standard tool for at least partial form locking contact with the tool for fastening or disengaging the fastening system, wherein the tool engagement surface includes at least one weak spot which facilitates a deformation of the weak spot and/or at least a deformation or weakening of a portion adjacent to the weak spot when imparting a particular torque upon the tool engagement surface in order to indicate an unauthorized use and/or an authorized use with a sufficiently large torque.

The inventors have found that the object can be achieved with a surprisingly simple configuration, wherein the tool engagement surface includes at least one weak spot which causes a deformation of the weak spot and/or of a portion adjacent to the weak spot when a particular torque is imparted upon the tool engagement surface in order to indicate an unauthorized use or indicate an authorized use with a sufficiently large torque.

Weak spot according to the instant invention means a weaker configuration in a corresponding standard tool engagement surface compared to the forces that are typically received from a standard tool so that forces are transmitted during opening or closing of the fastening system upon the fastener element by the standard tool adapted to the standard tool engagement surface so that at least a partial deformation or shearing of the tool engagement surface is provided due to the weak spot which safely indicates unauthorized manipulation or a sufficient torque application.

The tool engagement surface according to the invention is thus derived from currently available tool engagement surfaces and does not include any of the currently used tool engagement surfaces when the weak spot is provided as material recess so that the tool engagement surface according to the invention deviates from known tool engagement surfaces at least in sections.

"Defined torque" is thus either a torque of sufficient size which for example can prove application of sufficient torques during fixation of the fastening in safety relevant applications. Or the "defined torque" relates to a geometry of the torque which deviates from an authorized use of the fastening system, this means for an incomplete form locking between tool engagement surface and tool operating surface an at least partial deformation of the tool engagement surface is provided when a high torque is applied that is required for disengaging or fixating the fastening system.

The "defined torques" therefor are torques with a size that is required in principle for disengaging or fixating the fastening system (closure seal against unauthorized use) or these are torques during fixation which have a size that is required for a particular degree of fixation (torque indication during authorized use).

A "fastening" system does not only relate to systems for connecting additional elements like e.g. two plates forming additional elements which are connected by a bolt and a nut forming fastener elements of a fastening system but connections of the two fastener elements as such can also be provided like e.g. for a plug screw at an oil drain or similar.

The fastening system is advantageously a threaded fastening system where torques need to be applied for disengaging or fixating.

The fastener element according to the invention of a fastening system, in particular a bolt or nut, thus includes a tool engagement surface that is engageable by a tool, in particular a standard tool for at least partial form locking contact with the tool for fastening or disengaging the fastening system and is characterized in that the tool engagement surface includes at least one weak spot which causes a deformation of the weak spot or at least of a portion adjacent to the weak spot when imparting a particular torque upon the tool engagement surface in order to indicate unauthorized use and/or to indicate authorized use with a sufficiently large torque.

In an advantageous embodiment it is provided that the tool engagement surface includes plural portions, wherein at least one portion, advantageously at least half the number of the portions is provided with at least one weak spot.

In this context it is useful when the weak spots are symmetrically distributed about the tool engagement surface because this facilitates even and centered utilization of the tool.

Unauthorized manipulations are visible particularly easily when the weak spot is arranged at or proximal to a section of the portion where a main force is transferred from the tool to the tool engagement surface when the tool is used correctly. "Correct use" designates the normal use of a tool to transfer a torque and uses that do not deviate therefrom like e.g. impact uses or similar.

When the weak spot is symmetrically arranged with reference to the symmetry of the tool engagement surface the manipulations during opening and also during fixation are rendered visible.

However, when the weak spot is asymmetrically arranged with respect to the symmetry of the tool engagement surface unauthorized manipulations either during opening or during fixation can be rendered visible.

Thus, the asymmetric arrangement can not only be used for rendering unauthorized manipulations visible ('warranty seal"), but it can also be used as a "torque seal", thus for indicating a sufficiently high torque as required for example for wheel nuts for safe operations of a motor vehicle. Then the weak spot is predetermined so that a deformation is provided starting with a predetermined size of the torque. This predetermination can be implemented by adjusting one or plural parameters from the group including: number of the weak spots, shape and dimension of the weak spots, use of various types of weak spots and dimension of a portion where a main force is transferred from the tool to the tool engagement surface when the tool is used correctly.

An adjustment of these parameters can certainly also be used for symmetrically arranged weak spots. And this setting may not only be used for a torque seal but also for a warranty seal.

The tool engagement surface is advantageously provided as a straight slot, cross slot, external polygon, internal polygon, external involute, internal involute, Ribe, Torx®, Tri-Wing, Torq-Set, Torx®-Tamper or Pentalob. However, also any other typical standard tool engagement surface is useable. For example also other multi sided standard tool engagement surfaces can be used instead of a Torx® (six-curvature) standard tool engagement surface.

Particularly advantageously the weak spot is configured as a material recess and/or as a material variation.

A material recess with respect to the standard tool engagement surface can thus be configured as a uniform recess with respect to a particular portion of the standard tool engagement surface or as plural recesses like a slot or similar, thus it is a particular shape variation compared to a standard tool engagement surface.

Material variations can be provided for example in the form of fillings of the material recesses for example with a plastic material or by providing a porosity or similar so that the standard tool engagement surface as a whole has not been changed but the material compared to a force impact of a standard tool in the weak spot is not as strong as the surrounding material. This has the advantage that unauthorized persons do not immediately see the weak spot of the fastener element. Thus, the material variation uses a material that is less strong than the surrounding material.

Deformations caused by unauthorized use are optically directly detectable with an eye or suitable measuring tools are used for detecting minor deformations.

When the weak spot is a material variation, then an unauthorized use of the fastening system can be checked for by a person skilled in the art using a tool which has a tool operating surface that is configured corresponding to the tool engagement surface. This tool operating surface is thus used as a measuring tool to determine whether an unauthorized use has taken place. This is determined in that a deformation in the portion of the weak spot has occurred due to the unauthorized use which is directly indicated by the tool operating surface acting as a measuring tool. The tool engagement surface and thus the tool operating surface can be standard surfaces in this case of the material variation, wherein the standard surfaces are provided for example in the form of typical drives.

The weak spot should advantageously have an extension with respect to a length of the tool engagement surface (for example an edge length) so that a ratio of the extension to the length is advantageously provided in a range of 0.1-0.9, advantageously in a range of 0.2-0.6, in particular in a range of 0.25-0.5.

Advantageously the length of the weak spot over the tool engagement surface is at least equal to the length of an adjacent portion of the tool engagement surface because a tilting of tool operating surface about a point of the tool engagement surface is then provided so that no deformation of the tool engagement surface is caused in this portion. Then the weak spot configured as a recess shall have a shape so that a shearing or deformation is provided in the recess through the tool operating surface. For example a rounded recess would be provided in an internal hexagon because the tool operating surface then causes a deformation of this rounded surface.

Particularly advantageously two types of weak spots are provided. Thus, on the one hand side an adaptation to low tightening torques can be provided during disengagement and fixation of smaller fastener elements. On the other hand side an indication of unauthorized use or sufficient torques can be implemented in a particularly simple manner. Thus, a first type of weak spot is configured so that it represents a recess for the tool operating surface during disengagement and/or fixating, wherein the tool operating surface penetrates the recess during disengagement and/or fixation, whereas the second type of weak spot is configured so that it provides a resistance for the penetration of the tool operating surface into the recess provided by the first type of weak spot during disengagement or fixation of the fastening. During disengagement or fixation of the fastening this resistance is then overcome which provides a deformation of the second type of weak spot which provides an indication of unauthorized use or sufficient torque.

Particularly advantageously the second type of weak spot is provided as an undercut so that the resistance is formed by a protrusion which forms a rated fracture area or a rated deformation area.

Both types of deformations, however, can also be used independently from each other.

Instead of recesses, however, also in this case material variations can be provided wherein the first type of weak spot has a material variation which has a smaller resistance compared to the second type of weak spot.

The first type of weak spot thus provides a first resistance to the tool operating surface during disengagement or fixation and the second type of weak spot provides a second resistance to the tool engagement surface during disengagement or fixation wherein the sum of the first resistances is less than the sum of the second resistances.

The tool according to the invention for connecting, disengaging and testing the fastener element with a weak spot configured as a material recess in the tool engagement surface for which independent patent protection is requested is characterized in that a tool operating surface is provided that corresponds to the tool engagement surface wherein the tool operating surface includes at least one surface section that engages the material recess. Also this provides a measuring tool through which a person skilled in the art can directly determine the deformation that is caused by unauthorized use. Simultaneously connecting and disengaging the connecting element is provided with this tool safely and without any deformation since the tool operating surface is configured corresponding to the tool engagement surface.

Last not least independent patent protection is claimed for the method according to the invention for providing a fastening system with a closure seal and/or a torque indicator, wherein a fastener element of the fastening system, in particular a bolt or a nut is provided with a tool engagement surface that is engageable by a tool, in particular a standard tool for at least partial form locking engagement with the tool for fastening or disengaging the fastening system which is characterized in that the tool engagement surface is provided with at least one weak spot which causes a deformation of the weak spot and/or at least of a portion adjacent to the weak spot when imparting a particular torque upon the tool engagement surface in order to indicate unauthorized use or to indicate unauthorized use with a sufficiently large torque.

Independent patent protection is also claimed for the method according to the invention for indicating unauthorized used and/or a sufficient torque for a fastener element of a fastening system, wherein portions of the tool engagement surface of the fastener element are provided which are deformed or sheared off by engaging portions of the tool operating surface.

Advantageously the fastener element according to the invention is used in this method and/or the tool according to the invention is used for connecting, disengaging or testing of the fastener element.

Within the scope of the current invention features of the fastener element and/or of the tool can be used as features of the method and features of the method can also be used as features of the fastener element or of the tool unless stated differently.

Furthermore unless stated differently all features can be combined with each other at will.

BRIEF DESCRIPTION OF THE DRAWINGS

Additional features and advantages of the invention are described based on embodiments with reference to appended drawing figures, wherein identical and equivalent components are designated with identical reference numerals, wherein:

FIGS. 2A, 2B illustrate a first advantageous embodiment of the tool according to the invention and the combination of this tool with the fastener element according to FIGS. 1A, 1B;

FIGS. 3A, 3B illustrate a first standard tool and the combination of the fastener element according to FIG. 1A 1B with the first standard tool;

FIGS. 4A, 4B illustrate a second standard tool and the combination of the fastener element according to FIGS. 1A, 1B with the second standard tool;

FIGS. 6A, 6B illustrate a second advantageous embodiment of the tool according to the invention;

DETAILED DESCRIPTION OF THE INVENTION

FIGS. 1A, 1B, 5A, 5B, 7A, 7B, 8A, 8B, 9A, 9B, 11A, 11B, 13A, 13B and 14-19 schematically illustrate fastener elements according to the invention wherein FIGS. 1A, 5A, 7A, 8A, 9A, 11A, 13A and 14-19 respectively illustrate top views of the drive and FIGS. 1B, 5B, 7B, 8B, 9B, 11B and 13B illustrate the associated perspective views.

FIGS. 3A, 3B, 4A, 4B, 10 and 12 respectively illustrate combinations of fastener elements according to the invention with tools and thus in inserted condition of the tools into the respective fastener elements.

Figure 1A:
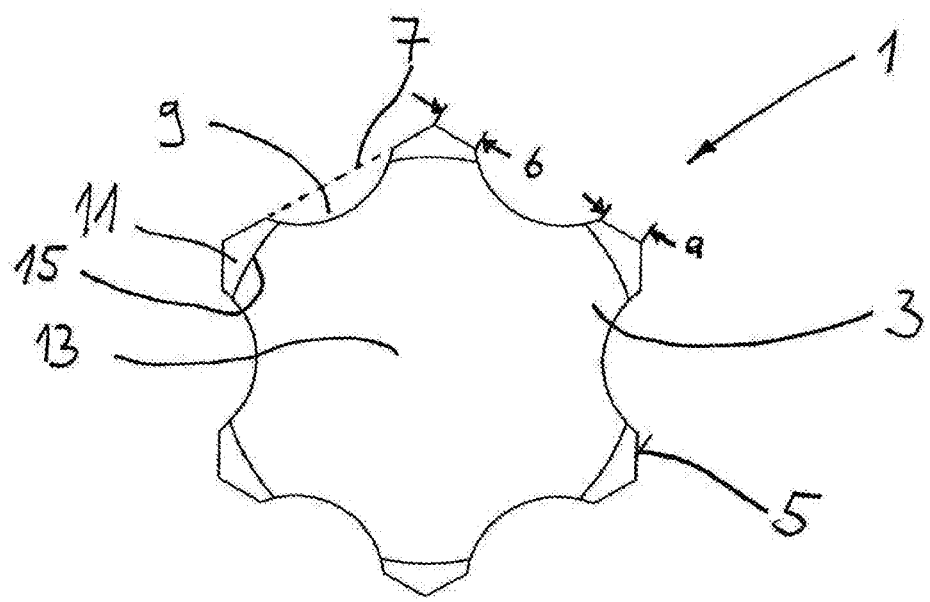
FIGS. 1A, 1B illustrate a first advantageous embodiment of the fastener element according to the invention.
Figure 1B:
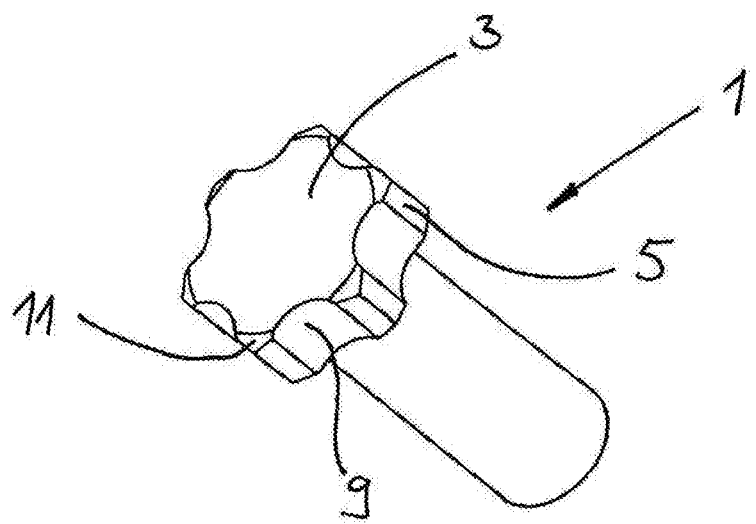

FIGS. 1A, 1B illustrate a first fastener element according to the invention configured as a bolt 1 whose drive 3 has a tool engagement surface 5 which is configured as a hexagonal which includes a weak spot configured as a circular segment shaped material recess 9 in each of the six edges 7. This material recess 9 has an extension b of approximately 0.5 with respect to an edge length a, this means b/a is approximately 0.5. Thus, singular points 11 are formed which are loaded when using the drive 3 with a hexagonal wrench, wherein the loading is performed relative to the drive base element 13 with respect to shearing along a shearing line 15.

The dimension of the weak spots formed as material recesses 9 and thus the dimension of the points 11 is thus selected so that the torques that are required for a disengaging or fixating a fastening provided by the screw 1 leads to a deformation or shearing in a portion of the points 11 or the transition between the points 11 and recesses 9 when a hexagonal Allen assembly wrench is used and not an assembly wrench whose tool operating surface provides full surface form locking along the tool engagement surface.

A tool 17 according to the invention that is illustrated in top view in FIG. 2A for authorized use of the fastener element 1 includes a tool engagement surface 19 which exactly corresponds with the tool engagement surface 5 that is provided with the material recesses 9. This means when actuating the drive 3 with the tool 17 a full surface form locking contact is established between the tool operating surface 19 and the tool engagement surface 5 so that points 11 cannot be sheared off. During an authorized use of this type no deformation of the drive will occur (c.f. FIG. 2B).

However, when one of the standard tools 21, 23 illustrated in FIGS. 3A 4A in top view is used wherein FIG. 3A illustrates an involute profile assembly wrench 21 and FIG. 4A illustrates a Torx® assembly wrench, then the drive 3 of the bolt 1 according to FIG. 1A, 1B has no full surface form locking with the respective tool operating surfaces 25, 27 so that a shearing of the points 11 occurs when using the involute profile assembly wrench 21 and a deformation of the points 11 occurs when using the Torx® assembly wrench 23. This shearing effect would for example also be observable when using a hexagonal wrench (also designated socket) which is not illustrated.

Figure 5A:
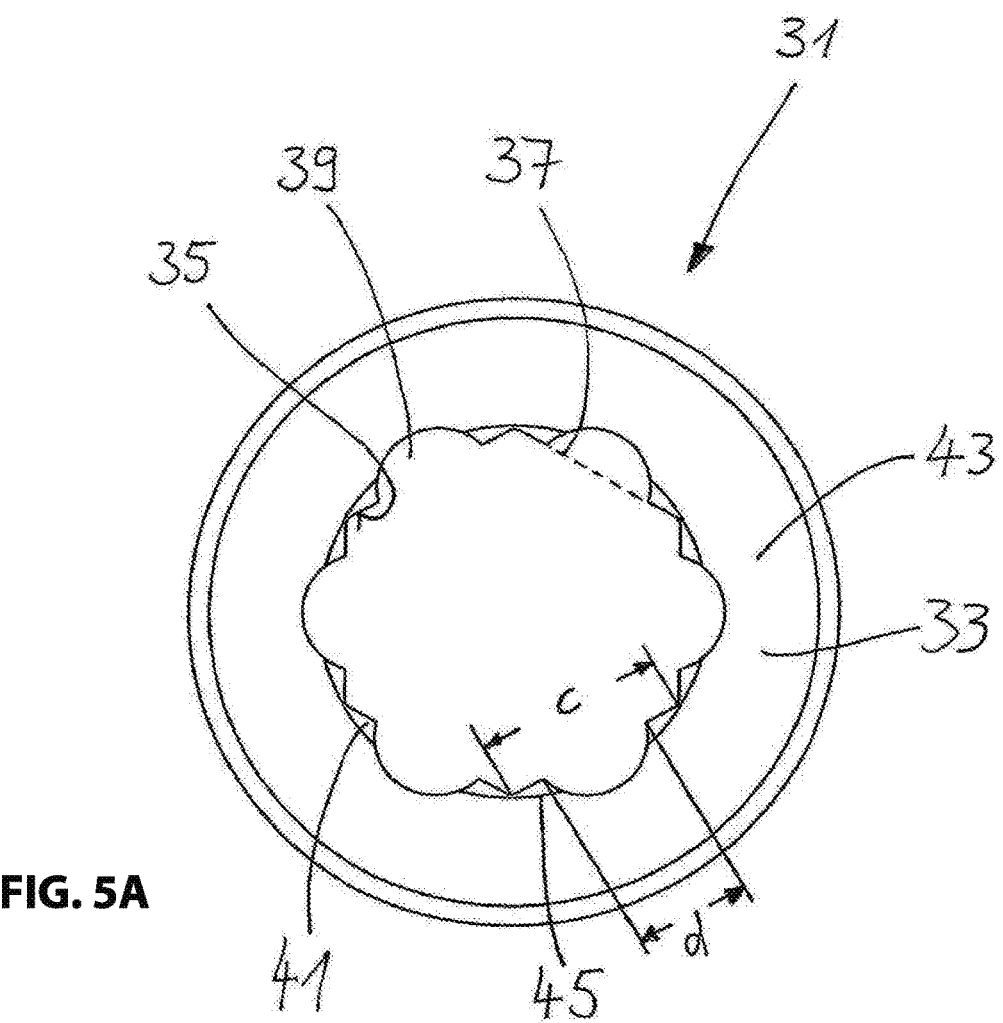
FIGS. 5A, 5B illustrate a second advantageous embodiment of the fastener element according to the invention.
Figure 5B:
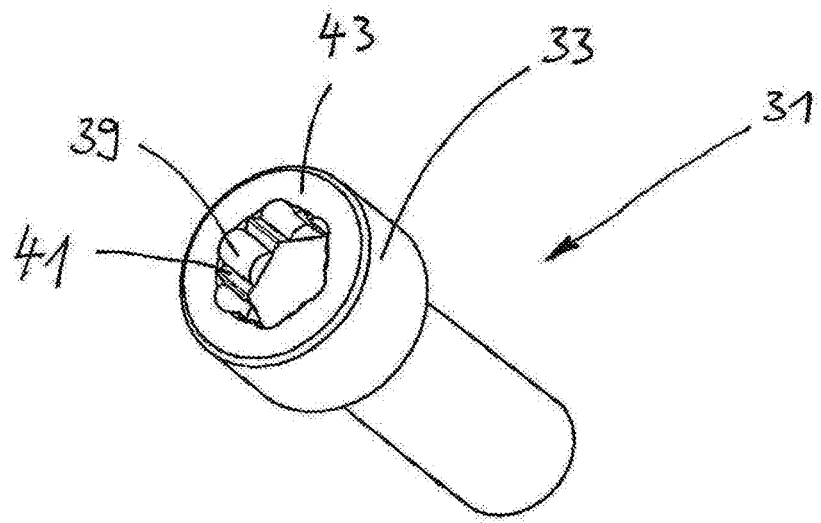

FIGS. 5A, 5B illustrate a second fastener element according to the invention configured as a bolt 31, whose drive 33 illustrates a tool engagement surface 35 which is configured as an internal hexagonal and which includes a weak spot configured as a circular segment shaped material recess 39 in each of the six edges 37. This material recess 39 has an extension d of approximately 0.5 with respect to the edge length c, this means d/c is approximately 0.5. This forms singular double points 41 which are loaded with a hexagonal relative to the drive base element 43 in shearing 45 when using the drive 33.

In order to prevent a deformation of this type a form locking special wrench 51 is used for unauthorized use of the drive 33 wherein the special wrench 51 includes corresponding circular segment shaped protrusions 55 corresponding to the material recesses 39 relative to a hexagonal 53 illustrated in FIG. 6A in a perspective view and in FIG. 6B in a top view.

The fastener elements 1, 31 described supra include symmetrically introduced material recesses 9, 39 with respect to the tool engagement surfaces 5, 35. This would create deformations of the drive 5, 35 for each unauthorized use, this means during disengagement and also during fixation of the fastener element 1, 31.

In FIGS. 7A, 7B, 8A, 8B, 9A, 9B, 11A and 11B respectively $3^{rd}$, $4^{th}$, $5^{th}$ and $6^{th}$ advantageous embodiments of the fastening dement 61, 63, 65, 67 according to the invention are shown in a top view of the respective drive 69, 71, 73, 75 or in a perspective view.

Thus, the bolts 61, 63 illustrated in FIGS. 7A, 7B, 8A, and 8B are bolts whose drive 69, 71 has a tool engagement surface 71, 79 which is configured as an external hexagonal and which includes a weak spot configured as a material recess 85, 87 in each of the six edges 81, 83.

The bolt 61 includes a semi-circular material recess 85 which is introduced clock wise from a center of the edge 81 towards a corner 89. With reference to the edge length e the material recess 85 has an extension f of approximately 0.25, this means f/e is approximately 0.25 Thus, symmetrical points 91 are configured which are loaded relative to the drive base element 93 in shearing when using the drive 69 counter clock wise with an Allen wrench but which are not deformed when using the drive 69 clock wise with an Allen wrench relative to the drive base element. This is caused by the fact that using the drive counter clock wise presses material of the point 91 into the material recess 85 which rounds the point 91.

Figure 7A:
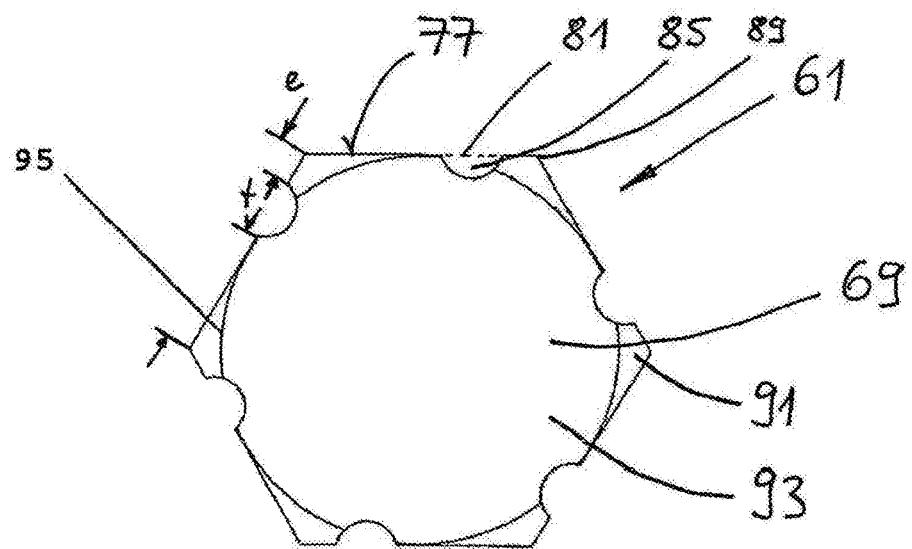
FIGS. 7A, 7B illustrate a third advantageous embodiment of the fastener element according to the invention.
Figure 7B:
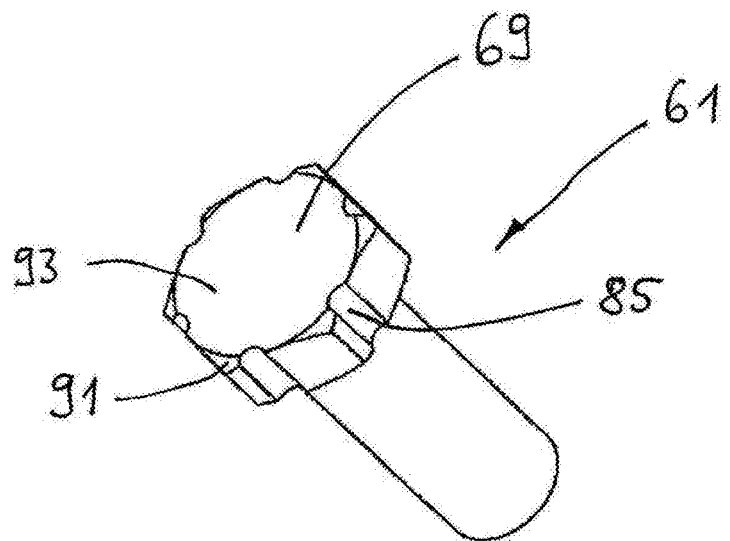
Figure 8A:
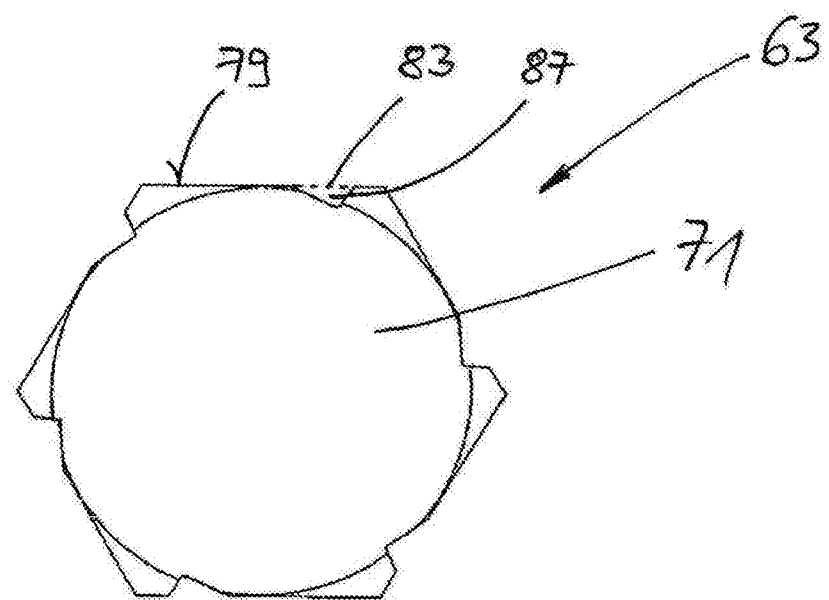
FIGS. 8A, 8B illustrate a fourth advantageous embodiment of the fastener element according to the invention.
Figure 8B:
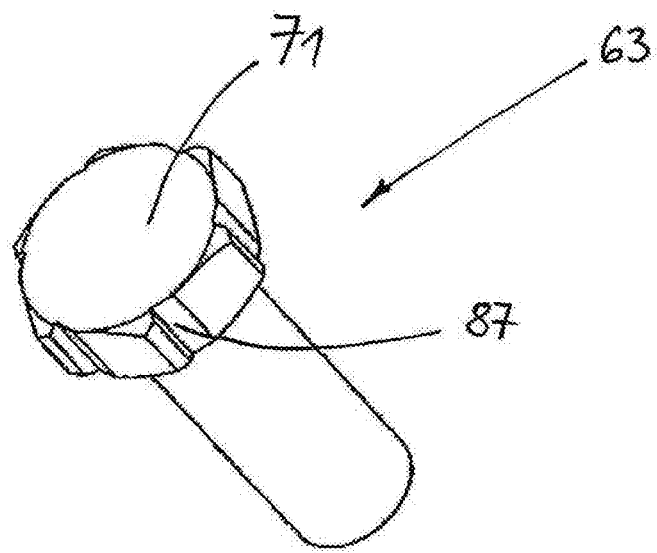

The bolt 63 according to FIG. 8A, 8B differs from the previously described bolt 61 according to FIG. 7A, 7B only in that the material recesses 87 are not only introduced in a semi-circular shape 85 but with angles. The effects with respect to an unauthorized use are the same as described for the bolt 61.

The bolts 65, 67 illustrated in FIGS. 9A, 9B, 11A and 11B are bolts whose drive 73, 75 includes a tool engagement surface 97, 99 which is configured as an internal hexagonal and which includes a weak spot configured as a material recess 105, 107 in each of the six edges 101, 103.

The bolt 65 includes semi-circular material recesses 105 which are introduced clockwise from a center of the edge 101 moved towards a corner 109. With respect to the edge length g each material recess 105 has an extension h of approximately 0.25, this means h/g is approximately 0.25. Thus, asymmetrically formed points 111 are formed which are loaded relative to the drive base element 113 in shearing 115 when using the drive 73 counter clockwise with a hexagonal (see FIG. 10), however when using the drive 73 clockwise with a hexagonal they are not deformed relative to the drive base element 113. This is caused by the fact that a counter clock wise use presses material of the point 111 into the material recess 105 which rounds the point 111.

Figure 9A:
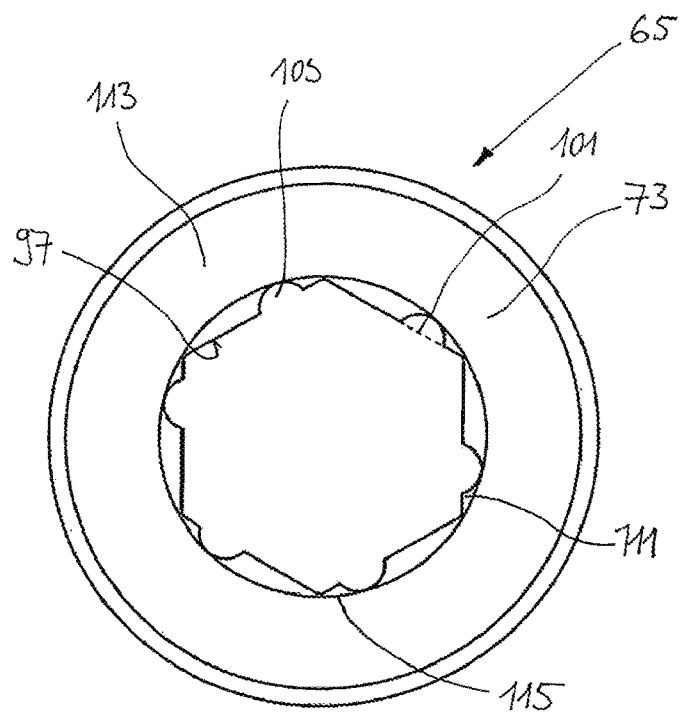
FIGS. 9A, 9B illustrate a fifth advantageous embodiment of the fastener element according to the invention.
Figure 9B:
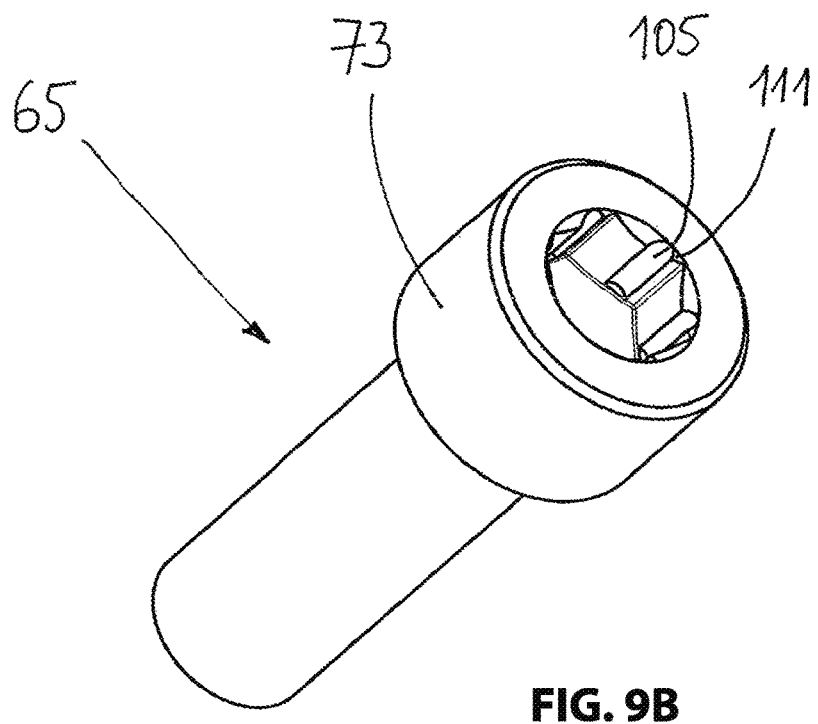
Figure 10:
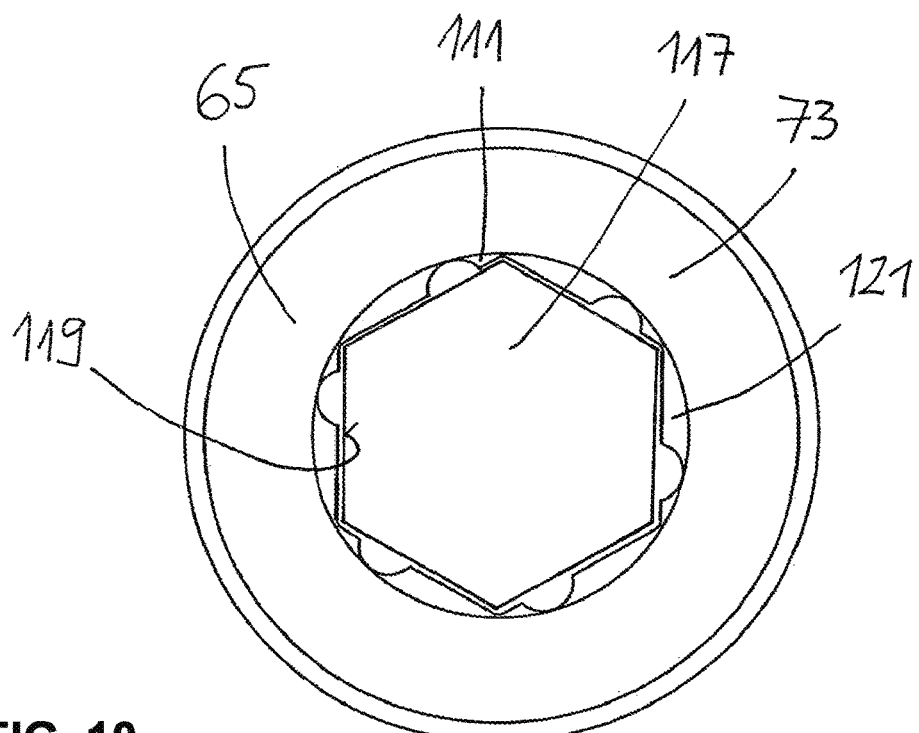
FIG. 10 illustrates a combination of the fastener element according to FIGS. 9A, 9B with a third standard tool.

When as illustrated in FIG. 10 in top view the standard tool configured as an Allen wrench 117 is used for using the drive 73, then there is no full surface form locking engagement between the tool operating surface 119 and the drive 73 of the bolt 65 according to FIG. 9A, FIG. 9B so that a shearing or rounding of the points 11 will be provided when the drive 73 is rotated counter clockwise. However, when the rotation is performed clockwise then there is sufficient contact between the tool operating surface 119 and the drive 73 in the portions 121 so that no deformation occurs.

Figure 12:
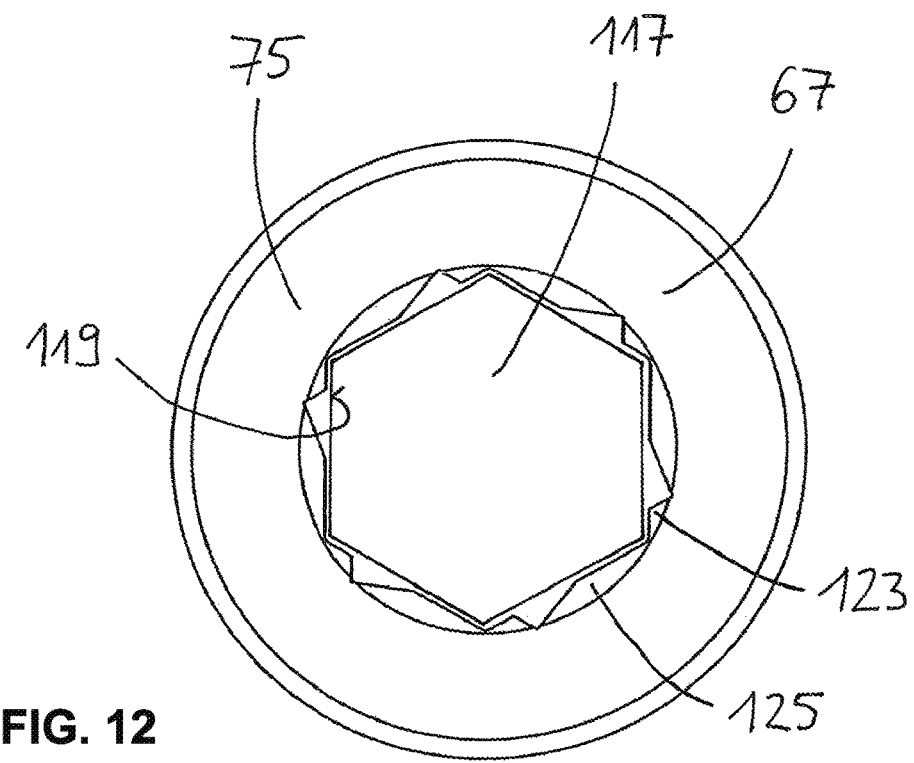
FIG. 12 illustrates a combination of the fastener element according to the invention according to FIG. 10a, 10b with a third standard tool.
Figure 11A:
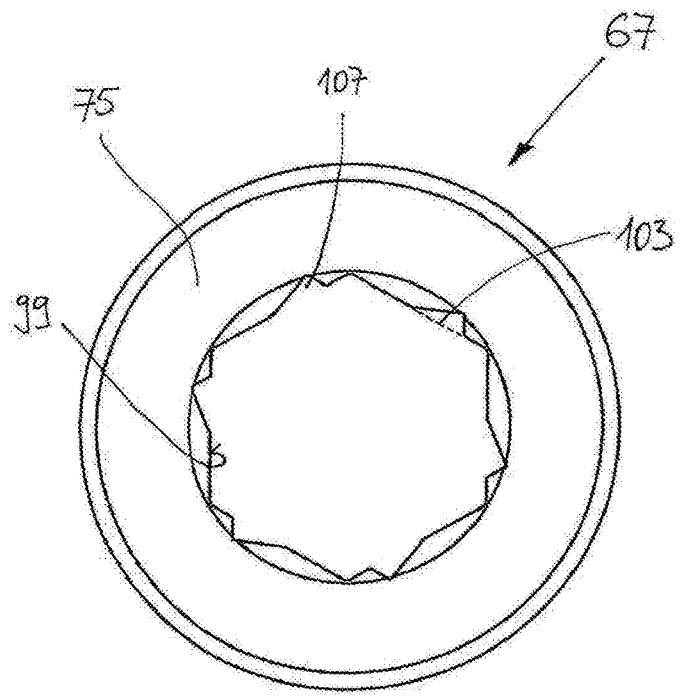
FIGS. 11A, 11B illustrate a sixth advantageous embodiment of the fastener element according to the invention.
Figure 11B:
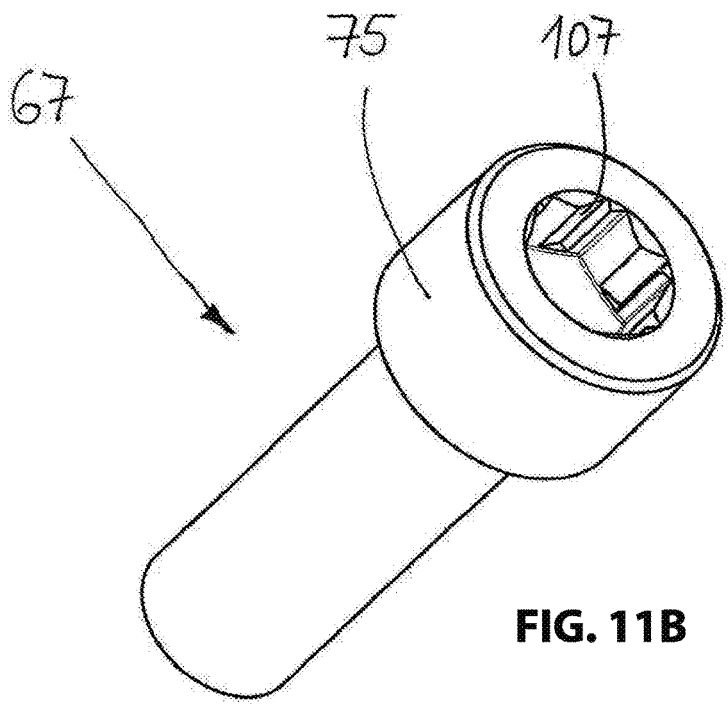

The bolt 67 according to FIG. 11A, 11B differs from the bolt 65 according to FIG. 9A, 9B described supra only in that the material recesses 107 are not introduced in a semi-circular shape 105 but with angles. The effects with reference to unauthorized use (c.f. FIG. 12) are the same as described for the bolt 65.

Thus, when the standard tool configured as an Allen wrench 117 as illustrated in FIG. 12 in top view is used for using the drive 75 then there is no full surface form locking between the drive 75 of the screw 67 according to FIG. 11A, 11B and the tool operating surface 119 so that a shearing or rounding of the points 123 is going to occur when the drive 75 is rotated counter clock wise. However, when a clock wise rotation is performed, then a sufficient contact between the tool operating surface 119 and the drive 75 is provided in the portions 125 so that no deformation is provided.

Figure 13A:
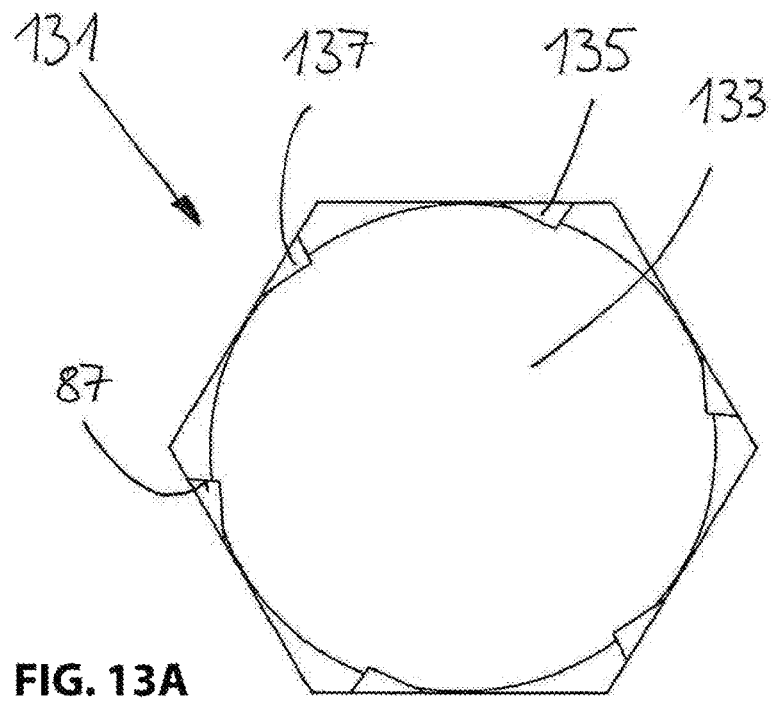
FIG. 13A, 13B illustrates a seventh advantageous embodiment of the fastener element according to the invention.
Figure 13B:
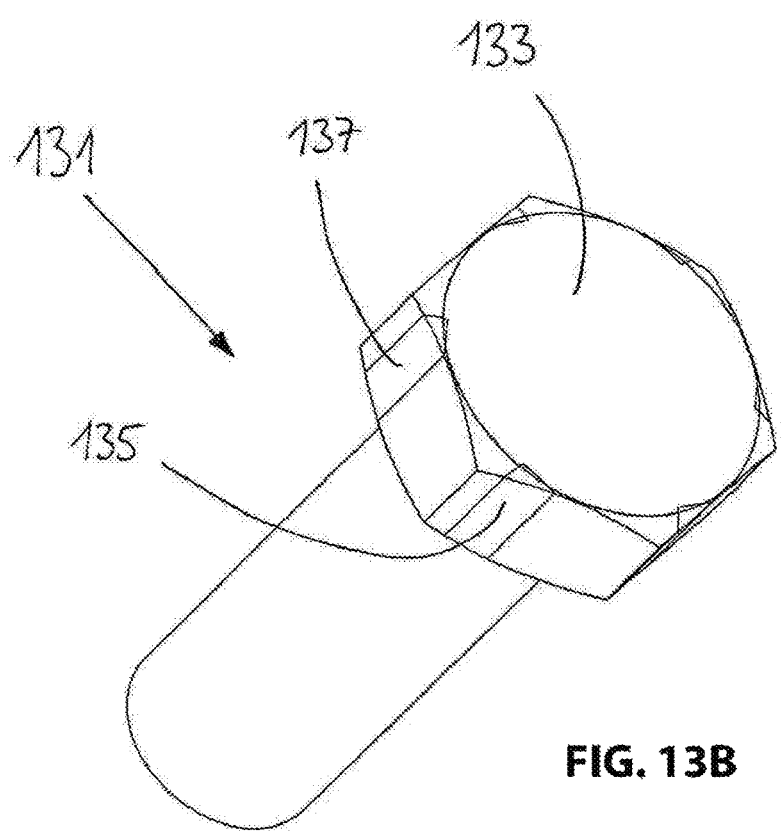

FIGS. 13A, 13B illustrate a $7^{th}$ advantageous embodiment of the fastener element 131 in top view and in a perspective view. It is evident that this is a bolt 131 with a drive 133 configured as an external hexagon. Thus, the weak spots 135 are generated in that the material recesses 87 of the bolt 63 of FIGS. 8A, 8B were subsequently filled again with the material 137 which has less hardness than the surrounding material 131. For example the material of the weak spot 137 is a plastic material and the remaining material is stainless steel. Then unauthorized use has the same effects as described for the screw 63 according to FIG. 8A, 8B.

Figure 14:
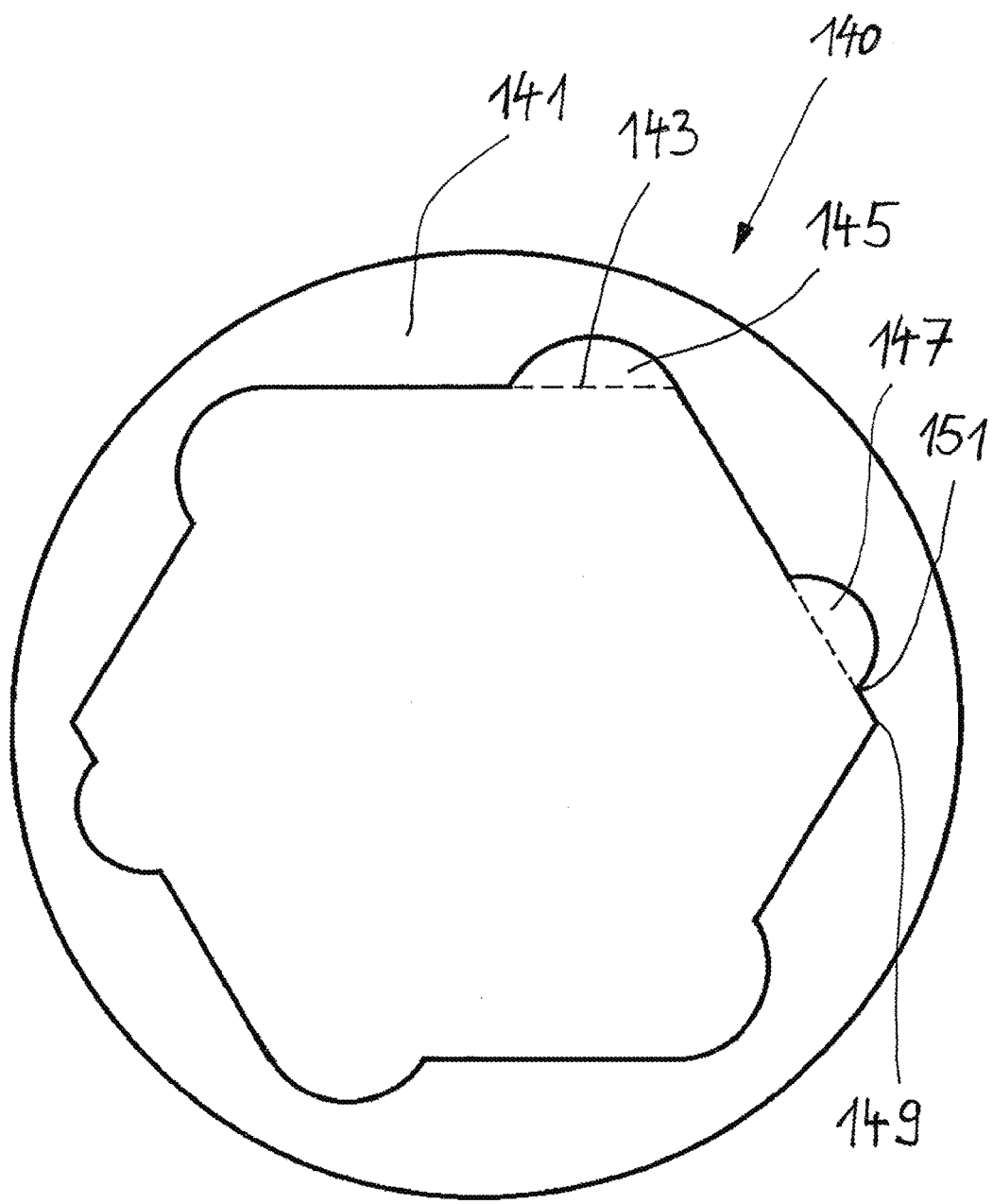
FIG. 14 illustrates an eighth advantageous embodiment of the fastener element according to the invention.

FIG. 14 illustrates an $8^{th}$ advantageous embodiment of the fastener element 140 in top view. It is easily evident that this is a bolt 140 with a drive 141 in the form of an internal hexagonal. Thus, two different types of weak spots 145, 147 are provided with reference to the edges 143, namely a first type of weak spots 145 which is arranged directly at a corner of the internal hexagonal and a second type of weak spot 147 which is arranged offset from the corners of the inner hexagonal, wherein the weak spot, however, is not centrally arranged between two corners, but slightly closer towards a corner 149.

This particular embodiment with two differently configured types of weak spots 145, 147 is selected when only small tightening torques can be used for smaller fastener elements 140 since there is a risk of damaging the fastener element 140 otherwise. Then material deformation occurs at the point 151 upon unauthorized use. In order for this material deformation to safely occur also for lower tightening torques fewer, namely advantageously two material deformations 147 of the second type and more, namely advantageously four material deformations 145 of the first type are used. Typically certainly also fewer material deformations 147 of the second type can be used depending on which tightening torques are tolerated by the fastener element 140.

Figure 15:
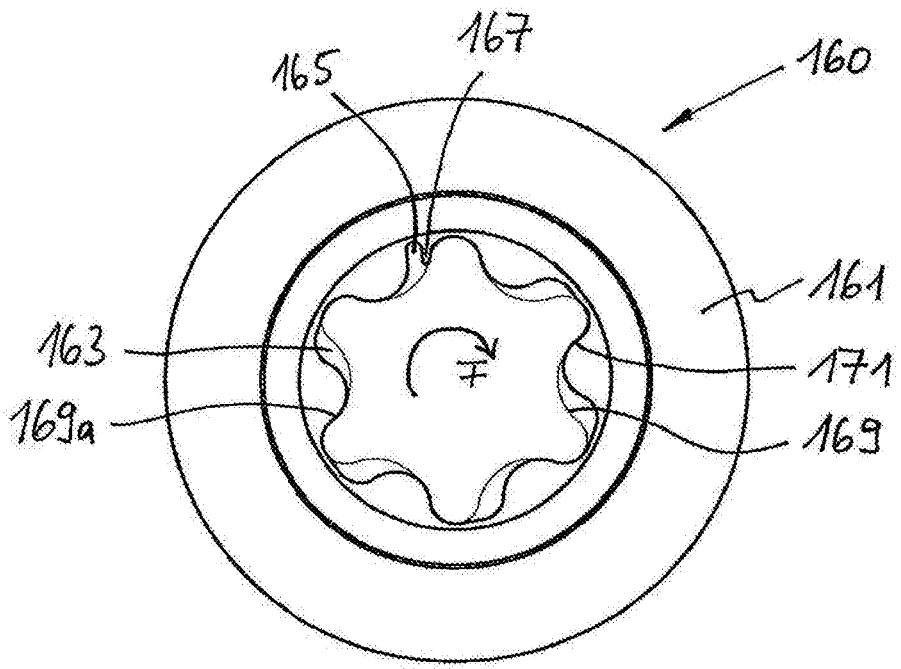
FIGS. 15, 16 illustrate a ninth advantageous embodiment of the fastener element according to the invention.
Figure 16:
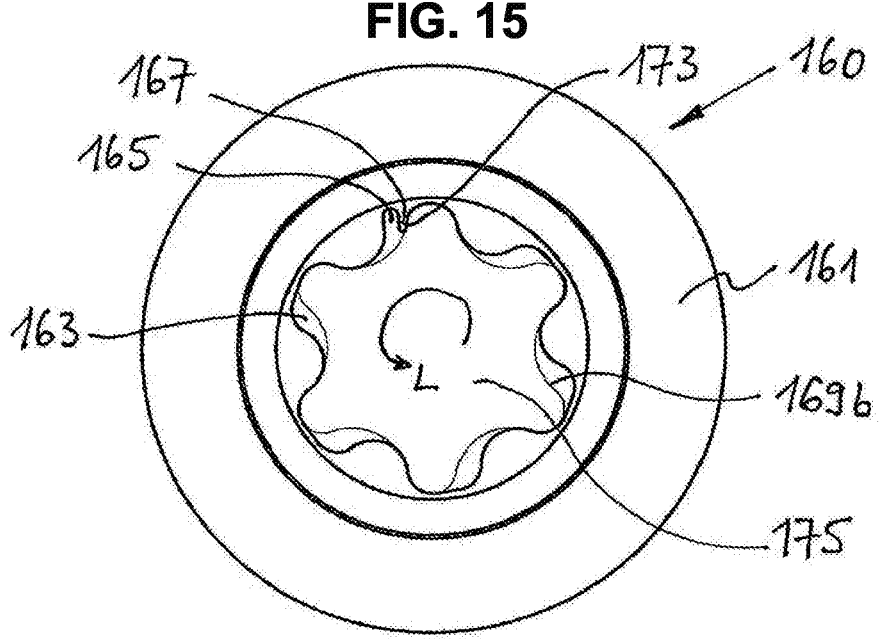

FIGS. 15 and 16 show a $9^{th}$ advantageous embodiment of the fastener element 160 in top view. It is evident that this is a bolt 160 with a Torx drive 161, thus also two different types of weak spots 163, 165 are provided, namely a first type of weak spot 163 which is arranged directly adjacent to a corner of the Torx tool engagement surface 171 and a second type of weak spot 165 is provided which is configured as an undercut with respect to the tool engagement surface 171 so that a protrusion 167 is obtained which includes the tool operating surface 169. It is evident from FIG. 15 that in fixation direction F the tool operating surface 169 with its sections 169a transmitting the main force is applied to the drive 161 with its entirety to the tool operating surface 171. Thus, the maximum force can be transferred during fixation.

It is evident from FIG. 16 that the tool operating surface 169 transferring the main force penetrates in disengagement direction L with its sections 169b almost everywhere into recesses of the weak spots of the first type 163, but contacts the surface 173 of the protrusion 167 partially. Due to the undercut 165 the protrusion 167 forms a rated fracture area or rated deformation area. When applying a force in the disengagement direction L wherein the force is required for disengaging the fastener element 160 the protrusion 167 is apparently sheared off by the tool operating surface 169 until the sections 169b that transmit the main force have completely penetrated into the recesses 163 or the shearing and deformation forces upon the protrusion 167 are greater than the forces used for disengagement. During disengagement the tool 175 has a propensity to penetrate the recesses of the weak spots 163 of the first type and is only prevented from doing so by the protrusion 167 forming a resistance, wherein the protrusion, however, is sheared off or at least deformed by the forces used for disengagement. The exact effect can be determined by a length and width of the protrusion 167 and by a number of the protrusions 167.

Figure 17A:
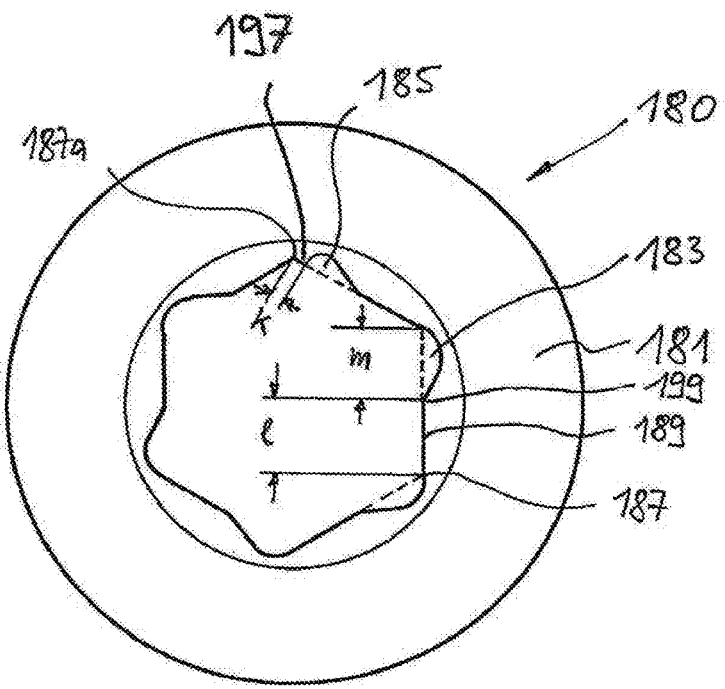
FIGS. 17A, 17B, 17C illustrate a tenth advantageous embodiment of the fastener element according to the invention.
Figure 17B:
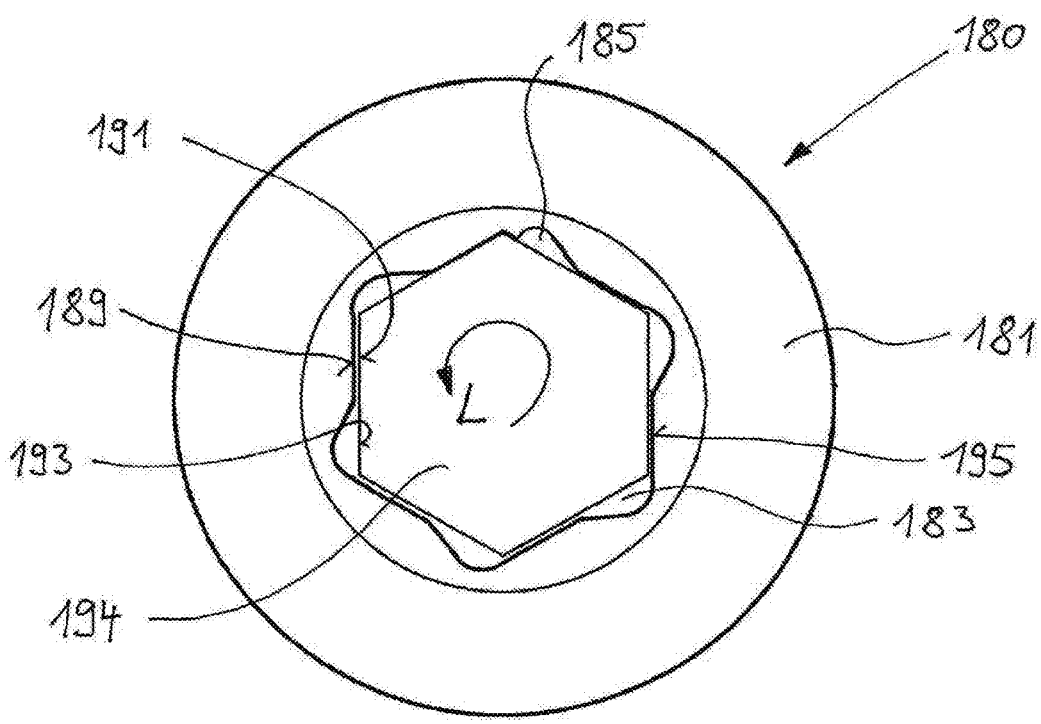
Figure 17C:
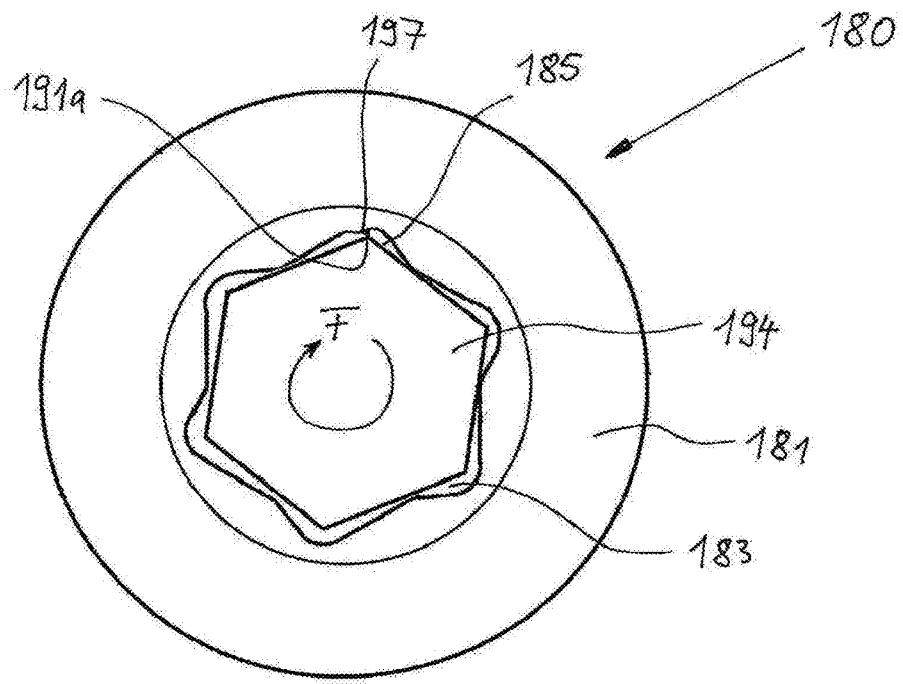

FIGS. 17A, 17B and 17c illustrates a tenth advantageous embodiment of the fastener element 180 according to the invention in top view. It is evident that this is a bolt 180 with an internal hexagonal drive 181. Thus, also two different types of weak spots 184, 185 are provided, namely a first type of weak spot 183 which is arranged as a recess directly adjacent to a corner 187 of the inner hexagonal tool engagement surface 189 and a second type of weak spot 185 which is configured as a recess that is arranged offset from the corner 187a by the distance.

It is apparent from FIG. 17B that the portions 191 of the tool operating surface 193 of the tool 194 which transfer the main force during disengagement L contact the portions 195 of the tool engagement surface 189 with their full surface so that the force required for disengagement can be transferred and no deformation is required.

It is apparent from FIG. 17c that only the portion 191 out of the portions of the tool operating surface 193 which transfer the main force during fixating F contacts the protrusion 197. Due to the recess 185 the protrusion 197 forms a rated fracture area or a rated deformation area. When applying a force in the fixation direction F which force is required for fixating the fastener element 180 the protrusion 197 is apparently sheared off when the force imparted upon the protrusion 197 by the applied torque is greater than it's shearing or deformation force. When the shearing or deformation force is adjusted so that a desired torque has to be applied in order to cause the shearing or deformation then an indication of an applied torque of a sufficient amount is provided in the sense of a torque seal. Setting the desired torque can be determined in turn by the length and width of the protrusion 197 and the shape of the recess 185 and the number of such protrusions 197.

In order to exclusively provide a shearing or deformation of the protrusion 197 and no deformation of the remaining tool engagement surface 189 a length m of the weak spot 183 of the first type on the tool engagement surface 189 is selected exactly as long as a length l of the adjacent portion of the tool engagement surface 189. Thus, a folding of the tool operating surface 193 relative to point 199 is provided during fixation. Thus, the length m can also be selected longer for this purpose.

In this embodiment the first weak spot 183 is configured rounded. Thus, it has a shape so that a shearing or deformation is provided by the tool operating surface 193 in the recess 183 (not illustrated in FIG. 17*c*). Thus, a deformation or shearing of the protrusion 197 is provided and also a deformation of the recess 183. In order to prevent the latter the recess 183 would be configured corresponding to the tool operating surface 193 so that the tool operating surface 193 contacts the recess 183 flat in a folded over condition.

Figure 18:
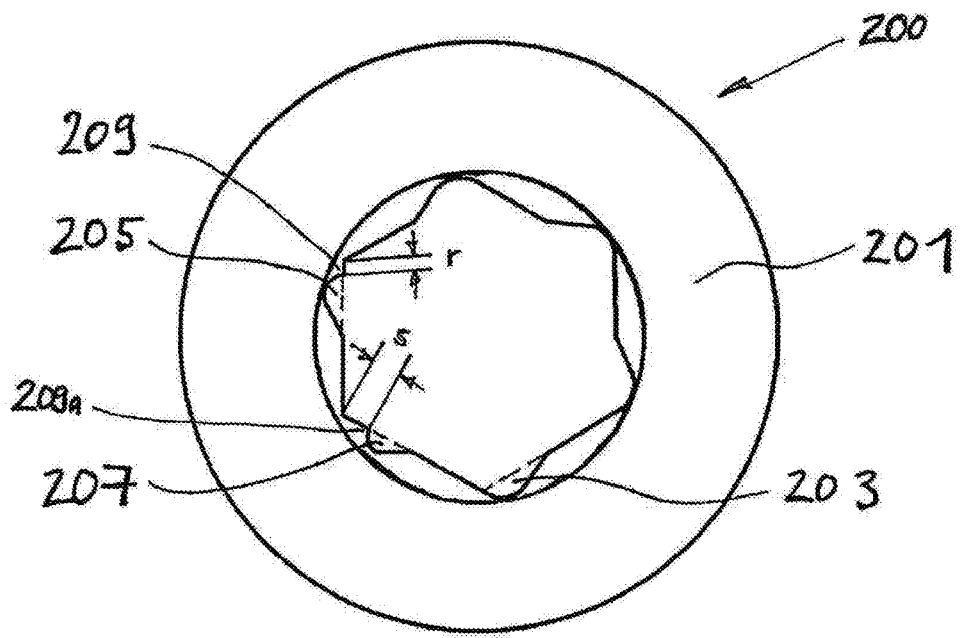
FIG. 18 illustrates an eleventh advantageous embodiment of the fastener element according to the invention.

FIG. 18 illustrates and eleventh advantageous embodiment of the fastener element 200 in top view. It is evident that this is essentially a drive 201 with an inverted configuration compared to the fastener element 180. Thus, a shearing or deformation of the protrusion 209 formed by the weak spot 205 of the second type is formed when the warranty seal is disengaged and the tool operating surface in turn has a propensity to penetrate the recess of the weak spot 203 of the first type. Furthermore an additional weak spot 207 of the second type is provided wherein the protrusion 209*a* formed by the weak spot 207 is slightly larger than the protrusion 209 since the length s is greater than the length r. The different protrusions facilitate to define the indicated torques more precisely in particular for torque seals, for example when particular protrusions to be fabricated are out of tolerance ranges that can be implemented through fabrication.

This combination of different weak spots of the second type can also be used for torque seals for example when an inverted configuration of the drive 201 from FIG. 18 is used. Thus the torques for warranty seals can also be defined more precisely.

As a matter of principle also a combination of warranty seal and torque seal is useful, for example a torque seal according to FIGS. 17A and 17*c* is provided in fixation direction F and in disengagement direction L for example a protrusion according to FIG. 15. A combination of this type is provided in principle already with the bolt 31 according to FIG. 5A, 5B, wherein the recess 39 would not be arranged symmetrically but asymmetrically in order to define tightening and disengagement torques precisely.

Figure 19:
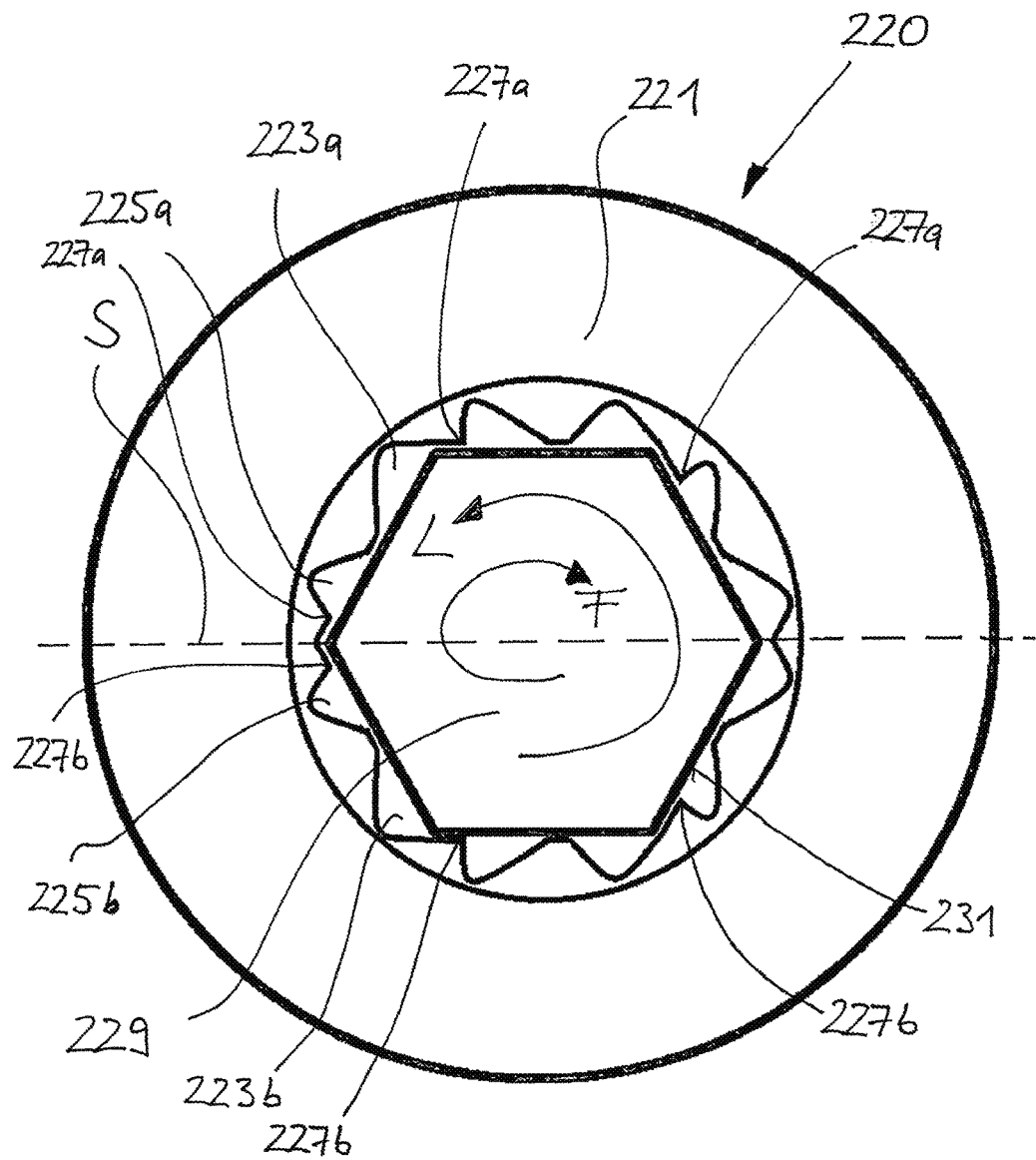
FIG. 19 illustrates a twelfth advantageous embodiment of the fastener element according to the invention.

An embodiment of this type is illustrated in FIG. 19. A bolt 220 with an internal hexagonal drive 221 is shown, wherein the drive 221 includes weak spots of the first type 223*a*, 223*b* and weak spots of the second type 225*a*, 225*b* that are respectively arranged mirror symmetrical with respect to a mirror plane S, wherein the weak spots are respectively provided in the form of recesses, wherein the weak spots of the second type 225*a*, 225*b* respectively form protrusions 227*a*, 227*b* which act against the tool 229. This particular embodiment causes a penetration of the tool operating surface 231 into the weak spots of the first type 223*a* in disengagement direction L and the weak spots of the second type are 223*b* in the fixation direction, wherein the protrusions 227*b* have to be overcome as a resistance in the disengagement direction and the protrusions 227*a* have to be overcome as resistances in the fixation direction.

It is appreciated that all drawn shear lines are not actual body lines but are only drawn for illustration purposes.

Unless stated differently all features of the instant invention can be combined with each other freely. Also the features described in the figure description unless stated differently can be freely combined with other features of the invention. Thus, device features can also be used as method features and method features can be used as device features.

It has become apparent that the instant invention renders manipulations by unauthorized persons detectable in a very simple and cost effective manner for fastener elements of a fastening system or it can be determined very easily whether a particular predetermined torque was correctly used for fastener elements of a fastening system.

REFERENCE NUMERALS AND DESIGNATIONS 1 bolt
3 drive
5 tool engagement surface
7 edges
9 material recess
a edge length
b extension
11 points
13 drive base element
15 shear off line
17 tool
19 tool operating surface
21, 23 standard tools
25, 27 tool operating surface
31 bolt
33 drive
35 tool engagement surface
37 edges
39 material recess
c edge length
d extension
41 twin points
43 drive base element
45 shear off line
51 special wrench
53 hexagonal
55 protrusions
61, 63, 65, 67 fastener element
69, 71, 73, 75 drive
77, 79 tool engagement surface
81, 83 edges
85, 87 material recess
89 corner
e edge length
f extension
91 point
93 drive base element
95 shear off line
97, 99 tool engagement surface
101, 103 edge
105, 107 material recess
109 corner
g edge length
h extension
111 point
113 drive base element 115 shear off line
117 Allen wrench
119 tool operating surface
121 portion
123 point
125 portion
131 fastener element
133 drive
135 weak spot
137 filling material
140 fastener element
141 drive
143 edge
145 material recess
147 material recess
149 corner
151 point
160 bolt
161 Torx drive
163, 165 weak spot
167 protrusion
169 tool operating surface
F fixation direction
169a main force transferring sections of tool operating surface 169
L disengagement direction
169b main force transferring section of tool operating surface 169
171 Torx tool engagement surface
173 surface of protrusion 167
175 tool
180 bolt
181 internal hexagon drive
183, 185 weak spots, recesses
187 corner of inner hexagonal tool engagement surface 189
187a corner of inner hexagonal tool engagement surface 189
189 inner hexagon tool engagement surface
k distance
L disengagement direction
191 main force transferring portions of the tool operating surface 193
191a main force transmitting portion of the tool operating surface 193
193 tool operating surface
195 portions of the tool engagement surface 189
F fixation direction
197 protrusion
l length of weak spot 183
m length of adjacent portion of tool operating surface 189
199 point
200 bolt
201 drive
203, 205, 207 weak spots
209, 209a protrusions
r, s lengths
220 bolt
221 drive
223a, 223b weak spots, recesses
225a, 225b weak spots, recesses
227a, 227b protrusions
229 tool
231 tool operating surface
S mirror plane

What is claimed is:

1. A fastener element of a fastening system, the fastener element comprising:
a tool engagement surface that is engageable by a tool for at least partial form locking contact with the tool for fastening or disengaging the fastening system,
wherein the tool engagement surface includes at least one weak spot which facilitates a deformation of the weak spot or at least a deformation or weakening of a portion adjacent to the weak spot when a particular torque is imparted from the tool to the tool engagement surface which indicates an unauthorized use or an authorized use with a sufficiently large torque,
wherein the tool engagement surface is configured as a straight slot, or cross slot, or external polygon, or internal polygon, or external involute, or internal involute, or Ribe, or Torx®, or Tri-Wing, or Torq-Set, or Torx®-Tamper or Pentalob, and
wherein the tool is a straight slot, or cross slot, or external polygon, or internal polygon, or external involute, or internal involute, or Ribe, or Torx®, or Tri-Wing, or Torq-Set, or Torx®-Tamper or Pentalob tool.

2. The fastener element according to claim 1,
wherein the tool engagement surface includes plural portions, and
wherein at least one portion or at least half of a number of the plural portions is provided with at least one weak spot.

3. The fastener element according to claim 1, wherein the weak spot is arranged at or proximal to a section of a portion where a main force is transferred from the tool to the tool engagement surface when the tool is used correctly.

4. The fastener element according to claim 1, wherein the weak spot is symmetrically arranged with respect to a symmetry of the tool engagement surface.

5. The fastener element according to claim 1, wherein the weak spot is asymmetrically arranged with reference to a symmetry of the tool engagement surface.

6. The fastener element according to claim 1, wherein the weak spot is configured as a material recess or as a material variation.

7. A tool for fastening, disengaging and testing the fastener element according to claim 6,
wherein the tool includes a tool operating surface corresponding to the tool engagement surface, and
wherein the tool operating surface includes at least one surface section engaging the material recess.

8. The fastener element according to claim 1, wherein two different types of weak spots are provided.

9. The fastener element according to claim 1,
wherein a first type of weak spot is provided which poses a first resistance against the tool operating surface during disengagement or fixation, and
wherein the first type of weak spot is configured as a recess into which the tool operating surface penetrates during the disengagement or the fixation.

10. The fastener element according to claim 1, wherein a length of the weak spot along the tool engagement surface is equal to or greater than a length of an adjacent portion of the tool engagement surface.

11. The fastener element according to claim 1,
wherein a second type of weak spot is provided which provides a second resistance for the tool operating surface during disengagement or fixation,
wherein the second resistance is advantageously provided by a rated fracture area or a rated deformation area, and wherein the rated fracture area or the rated deformation area is formed by providing the second weak spot by an undercut.

12. The fastener element according to claim 1, wherein at least one parameter from the group consisting of number of weak spots, shape of weak spot, dimension of the weak spot, use of various types of weak spots and dimension of the portion at which the main force is transferred from the tool to the tool engagement surface when the tool is used correctly is adjusted so that a deformation of the weak spot or of a portion adjacent to the weak spot is provided when a torque of a predetermined amount is applied.

13. A method for providing a fastening system with a fastening seal or a torque indication, comprising the steps:
   providing a fastener element of the fastening system-with a tool engagement surface that is engageable by a tool for at least partial form locking contact with the tool for fastening or disengaging the fastening system;
   providing the tool engagement surface with at least one weak spot which facilitates a deformation of the weak spot or at least a deformation or weakening of a portion adjacent to the weak spot;
   imparting a particular torque from the tool to the tool engagement surface; and
   indicating an unauthorized use or an authorized use with a sufficiently large torque,
   wherein the tool engagement surface is configured as a straight slot, or cross slot, or external polygon, or internal polygon, or external involute, or internal involute, or Ribe, or Torx®, or Tri-Wing™, or Torq-Set, or Torx®-Tamper or Pentalob,
   wherein the tool is a straight slot, or cross slot, or external polygon, or internal polygon, or external involute, or internal involute, or Ribe, or Torx®, or Tri-Wing, or Torq-Set, or Torx®-Tamper or Pentalob tool.

14. The method according to claim 13, comprising the step using a fastener element including:
   a tool engagement surface that is engageable by a tool for at least partial form locking contact with the tool for fastening or disengaging the fastening system, wherein the tool engagement surface includes at least one weak spot which facilitates a deformation of the weak spot or at least a deformation or weakening of a portion adjacent to the weak spot when a particular torque is imparted from the tool to the tool engagement surface which indicates an unauthorized use or an authorized use with a sufficiently large torque for fastening, disengaging and testing the fastener element.

15. The method according to claim 13,
   wherein the weak spot is configured as a material recess or as a material variation,
   wherein the tool includes a tool operating surface corresponding to the tool engagement surface, and
   wherein the tool operating surface includes at least one surface section engaging the material recess.

* * * * *